(12) United States Patent
Eom et al.

(10) Patent No.: US 11,360,901 B2
(45) Date of Patent: Jun. 14, 2022

(54) METHOD AND APPARATUS FOR MANAGING PAGE CACHE FOR MULTIPLE FOREGROUND APPLICATIONS

(71) Applicant: Research & Business Foundation Sungkyunkwan University, Suwon-si (KR)

(72) Inventors: Young Ik Eom, Suwon-si (KR); Jong Gyu Park, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 0 days.

(21) Appl. No.: 17/073,493

(22) Filed: Oct. 19, 2020

(65) Prior Publication Data

US 2021/0117331 A1 Apr. 22, 2021

(30) Foreign Application Priority Data

Oct. 17, 2019 (KR) .......................... 10-2019-0129179

(51) Int. Cl.
*G06F 12/08* (2016.01)
*G06F 12/0871* (2016.01)

(52) U.S. Cl.
CPC .. *G06F 12/0871* (2013.01); *G06F 2212/7201* (2013.01)

(58) Field of Classification Search
CPC ..................... G06F 12/0871; G06F 2212/7201
USPC ........................................................ 711/118
See application file for complete search history.

(56) References Cited

U.S. PATENT DOCUMENTS

| 2017/0357450 A1* | 12/2017 | Barbou-Des-Places | G06F 3/0679 |
| 2019/0205266 A1* | 7/2019 | Fang | G06F 12/0253 |

FOREIGN PATENT DOCUMENTS

| KR | 10-1711945 B1 | 3/2017 |
| KR | 10-1915944 B1 | 11/2018 |

OTHER PUBLICATIONS

Park, J. et al. "URS: User-Based Resource Scheduling for Multi-User Surface Computing Systems," in *IEEE Transactions on Consumer Electronics*, vol. 65, No. 3, pp. 426-433, Aug. 2019 (10 Pages in English).

* cited by examiner

*Primary Examiner* — Hua J Song
(74) *Attorney, Agent, or Firm* — NSIP Law

(57) ABSTRACT

Provided are a method and apparatus for managing a page cache for multiple foreground applications. A method of managing a page cache includes identifying an application accessing to data stored in storage; allocating a page used by the application for the accessed data to a page cache; setting a page variable corresponding to a type of the identified application to the allocated page; and managing demoting of the allocated page based on the set page when the allocated page is a demoting target.

18 Claims, 6 Drawing Sheets

METHOD AND APPARATUS FOR MANAGING PAGE CACHE FOR MULTIPLE FOREGROUND APPLICATIONS

CROSS-REFERENCE TO RELATED APPLICATIONS

This application claims priority to Korean Patent Application No. 10-2019-0129179 filed on 17 Oct. 2019 in Korea, the entire contents of which are hereby incorporated by reference in their entirety.

BACKGROUND

1. Technical Field

The present disclosure relates to a method and apparatus for managing a page cache for multiple foreground applications.

2. Description of Related Art

A page cache is a type of a system memory, is a space in which applications temporarily store request data from storage for a certain period of time, and was developed to compensate for a relatively slow storage speed. Because only a limited space is allocated to the page cache on a memory, when the memory is insufficient, the data should be stored at the storage. This process is referred to as a page cache demoting process.

The conventional page cache is a resource shared by several applications, and data stored in the page cache is not recorded by which application is used. Therefore, the conventional page cache manages and demotes data therein by utilizing information on whether it has been accessed recently and how many times it has been accessed.

Recently, a multi-user environment in which multiple users operate a single device such as a table top, technology that divides one screen into multiple screens by software, and even a device that connects more than one display to a single mobile device have appeared. In such a system, one or more foreground applications may exist, and in this case, the conventional system cannot provide a resource priority to a plurality of foreground applications. The foreground application is an application in which a user is actually currently using and has a great influence on user experience (UX). Accordingly, in a modern computing system in which a plurality of foreground applications exist, there is an urgent need for new page cache management technology that can effectively improve a performance of the foreground application.

As described above, a multi-user environment in which a number of people share a single device such as a table top has recently appeared, and in a mobile device, as a size of a display increases, the display may be divided by software and several applications may be simultaneously driven on a screen. Further, flexible display and dual display mobile devices have also been developed and sold on the market. In this environment, unlike a conventional single foreground application environment, a plurality of applications may operate in a foreground displayed on a screen. Therefore, an optimization process is needed to improve a performance of multiple foreground applications at a computer system.

SUMMARY

The present disclosure provides a method and apparatus for managing a page cache for a foreground application that can improve a performance of a foreground application in at least one foreground application environment.

The present disclosure also provides a method and apparatus for managing a page cache for a foreground application capable of improving a performance of the foreground application by delaying page demoting in a page cache used by the foreground application in at least one foreground application environment.

However, the problems to be solved by the present disclosure are not limited thereto, and may be variously extended even in an environment within a range not departing from the spirit and scope of the present disclosure.

According to one example embodiment of the present disclosure, a method of managing a page cache by a page cache management apparatus includes identifying an application accessing to data stored in storage; allocating a page used by the application for the accessed data to a page cache; setting a page variable corresponding to a type of the identified application to the allocated page; and managing demoting of the allocated page based on the set page when the allocated page is a demoting target.

The managing of demoting may include delaying, if the identified application is a foreground application, demoting of the allocated page.

The managing of demoting may include delaying the demoted page from an active list of the page cache to an inactive list of the page cache.

The managing of demoting may include demoting the allocated page, when the allocated page is a demoting target in an inactive list of the page cache.

The managing of demoting may include demoting, if the identified application is a background application, the allocated page.

The page variable corresponding to the identified application type may include a foreground use variable indicating whether a foreground application is used and an opportunity variable indicating remaining opportunities in a page demoting process.

The opportunity variable may be set to a predetermined initial value when allocating the page to the page cache.

The opportunity variable may be set to a predetermined initial value when the application satisfies a specific condition using the allocated page.

The opportunity variable may be reduced by a predetermined reduction value when moving from a tail of an active list of the page cache to a head of the active list in order to delay demoting of the allocated page.

When the identified application is multiple foreground applications, the opportunity variable may be differently set according to a priority of each of the multiple foreground applications.

According to another example embodiment of the present disclosure, a page cache management apparatus includes storage for storing data; a memory including a page cache for storing pages of data used by applications, and for storing at least one program; and a processor connected to the storage and the memory, wherein the processor, by executing the at least one program, is configured to identify an application accessing to data stored in the storage, to allocate a page used by the application for the accessed data to a page cache, to set a page variable corresponding to a type of the identified application to the allocated page, and to manage demoting of the allocated page based on the set page variable, when the allocated page is a demoting target.

When the identified application is a foreground application, the processor may delay demoting of the allocated page.

The processor may delay the demoted page from an active list of the page cache to an inactive list of the page cache.

When the allocated page is a demoting target in an inactive list of the page cache, the processor may demote the allocated page.

When the identified application is a background application, the processor may demote the allocated page.

The page variable corresponding to the identified application type may include a foreground use variable indicating whether a foreground application is used and an opportunity variable indicating remaining opportunities in a page demoting process.

The opportunity variable may be set to a predetermined initial value when allocating the page to the page cache.

When the application satisfies a specific condition using the allocated page, the opportunity variable may be set to a predetermined initial value.

In order to delay demoting of the allocated page, the opportunity variable may be reduced by a predetermined reduction value when moving from a tail of an active list of the page cache to a head of an active list.

When the identified application is multiple foreground applications, the opportunity variable may be set differently according to a priority of each of the multiple foreground applications.

According to another example embodiment of the present disclosure, as a non-transitory computer readable storage medium including at least one program executable by a processor, when the at least one program is executed by the processor, the at least one program may enable the processor to provide a non-transitory computer readable storage medium including instructions that enable to identify an application accessing to data stored in the storage, to allocate a page used by the application for the accessed data to a page cache, to set a page variable corresponding to a type of the identified application to the allocated page, and to manage demoting of the allocated page based on the set page variable when the allocated page is a demoting target.

DETAILED DESCRIPTION OF EXAMPLE EMBODIMENTS

Figure 1:
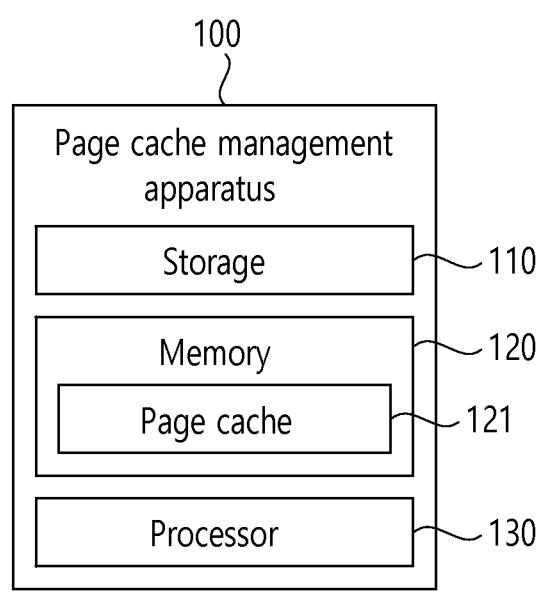
FIG. 1 is a block diagram illustrating a configuration of a method and apparatus for managing a page cache for multiple foreground applications according to an embodiment of the present disclosure.

The present disclosure can make various changes and have various embodiments, and specific embodiments will be illustrated in the drawings and described in detail.

However, this is not intended to limit the present disclosure to a specific embodiment, and it should be understood to include all changes, equivalents, or substitutes included in the spirit and scope of the present disclosure.

Terms such as first and second may be used for describing various components, but the components should not be limited by the terms. These terms are used only for the purpose of distinguishing one component from another component. For example, without departing from the scope of the present disclosure, a first component may be referred to as a second component, and similarly, a second component may be referred to as a first component. The term and/or includes a combination of a plurality of related listed items or any of a plurality of related listed items.

When it is described that a component is "connected" or "accessed" to another component, it should be understood that the component may be directly connected or accessed to the other component, but other components may exist in the middle. However, when it is described that a component is "directly connected" or "directly accessed" to another component, it should be understood that there is no other component in the middle.

The terms used in the present application are only used for describing specific embodiments, and are not intended to limit the present disclosure. Singular expressions include plural expressions unless the context clearly indicates otherwise. In the present application, terms such as "comprise" or "have" are intended to designate the presence of features, numbers, steps, operations, components, parts, or combinations thereof described in the specification, but it should be understood that they do not preclude in advance the possibility of the presence or addition of one or more other features, numbers, steps, operations, components, parts, or combinations thereof.

Unless otherwise defined, all terms used in the present specification, including technical or scientific terms, have the same meaning as commonly understood by one of ordinary skill in the art to which the present disclosure belongs. Terms such as those defined in commonly used dictionaries should be interpreted as having a meaning consistent with the meaning in a context of the related technology, and should not be interpreted as an ideal or excessively formal meaning unless explicitly defined in this application.

Hereinafter, preferred embodiments of the present disclosure will be described in more detail with reference to the accompanying drawings. In describing the present disclosure, the same reference numerals are used for the same components in the drawings in order to facilitate the overall understanding, and repeated descriptions of the same components are omitted.

FIG. 1 is a block diagram illustrating a configuration of a method and apparatus for managing a page cache for multiple foreground applications according to an embodiment of the present disclosure.

As illustrated in FIG. 1, a page cache management apparatus 100 according to an embodiment of the present disclosure includes storage 110, a memory 120, and a processor 130. However, all of illustrated components are not essential components. The page cache management apparatus 100 may be implemented by more components than the illustrated components, and by fewer components than the illustrated components.

Hereinafter, a detailed configuration and operation of each component of the page cache management apparatus 100 of FIG. 1 will be described.

The storage 110 stores data.

The memory 120 includes a page cache 121 that stores pages for data used by an application, and stores at least one program.

The processor 130 is connected to the storage 110 and the memory 120. By executing the at least one program, the processor 130 identifies an application accessing to data stored in the storage 110, allocates a page used by the application for the accessed data to the page cache 121, sets a page variable corresponding to the identified application type to the allocated page, and manages demoting of the allocated page based on the set page variable when the allocated page is a demoting target.

According to various embodiments, when the identified application is a foreground application, the processor 130 may delay demoting of the allocated page.

According to various embodiments, the processor 130 may delay the demoted page from an active list of the page cache 121 to an inactive list of the page cache 121.

According to various embodiments, when the allocated page is a demoting target in an inactive list of the page cache 121, the processor 130 may demote the allocated page.

According to various embodiments, when the identified application is a background application, the processor 130 may demote the allocated page.

According to various embodiments, a page variable corresponding to the identified application type may include a foreground use variable indicating whether a foreground application is used, and an opportunity variable indicating remaining opportunities in a page demoting process.

According to various embodiments, when a page is allocated to the page cache 121, the opportunity variable may be set to a predetermined initial value.

According to various embodiments, when an application satisfies a specific condition using the allocated page, the opportunity variable may be set to a predetermined initial value.

According to various embodiments, in order to delay demoting of the allocated page, the opportunity variable may be reduced by a predetermined reduction value when moving from a tail of an active list of the page cache 121 to a head of the active list.

According to various embodiments, when the identified application is multiple foreground applications, the opportunity variable may be set differently according to a priority of the foreground application.

In this way, in order to effectively improve a performance of multiple foreground applications in a page cache layer, the page cache management apparatus 100 according to an embodiment of the present disclosure first distinguishes data used by the multiple foreground applications. The page cache management apparatus 100 distinguishes the corresponding data used by the foreground application and then sets whether the data is used by the foreground application in the corresponding page when allocating the data to the page cache 121.

Thereafter, when the page cache needs to be demoted due to an insufficient idle memory, the page cache management apparatus 100 demotes only pages used by a background application without demoting pages used by the foreground application. Further, the page being used by the foreground application is moved to the head of the active list, with the remaining opportunities reduced. Thereby, data used by the foreground application may remain in the page cache 121 for as long as predetermined remaining opportunities. This can improve a performance of the foreground application.

Figure 2:
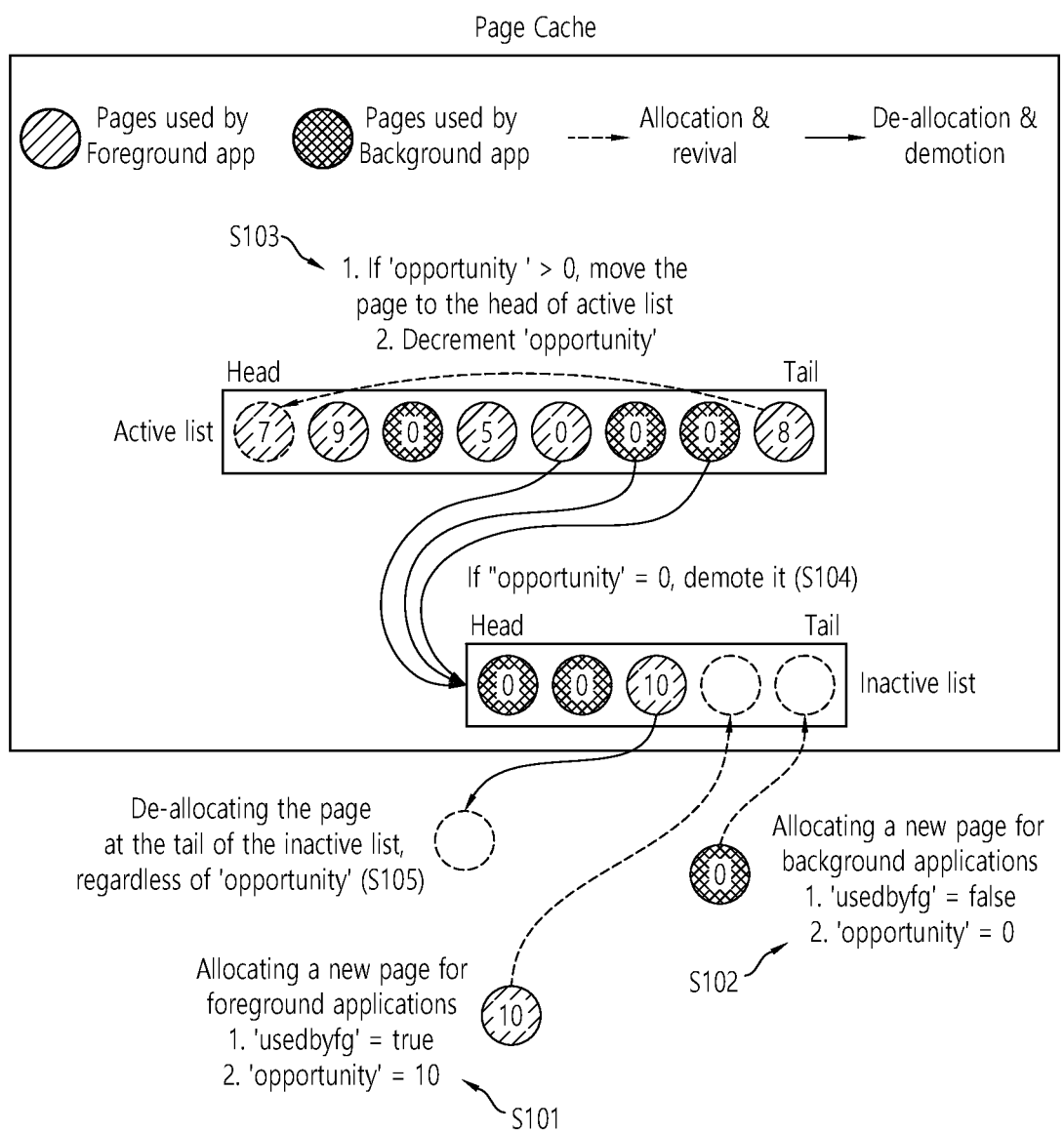
FIG. 2 is a diagram illustrating a page cache allocation and demoting operation in a method and apparatus for managing a page cache for multiple foreground applications according to an embodiment of the present disclosure.

FIG. 2 is a diagram illustrating a page cache allocation and demoting operation in a method and apparatus for managing a page cache for multiple foreground applications according to an embodiment of the present disclosure.

Current computer systems use a page cache to compensate for the slow storage 110. The page cache is a space on a main memory that temporarily stores data requested from the application to the storage 110, and when the data is requested, the page cache may quickly transmit data to the application without unnecessary I/O to the storage 110. Currently, the page cache manages data regardless of application, and determines whether to demote the data later depending on how and when the data was accessed.

Specifically, the page cache is configured with two least recently used (LRU) queues. The two LRU queues are referred to as an active list and an inactive list. The data is entered to the head of each list in order of recent access. When first data is accessed, the first data is located at a head of the inactive list, and when the data is accessed again later, the data is moved to the active list. In contrast, in a demoting process, data is transferred from the active list to the inactive list, and data located in a tail of the inactive list is transferred to storage. In this way, because the current page cache simply analyzes the access frequency and access time of the data regardless of whether the application is a foreground application, a performance of the foreground application cannot be effectively improved.

Because the foreground application communicates directly with a user, a performance of the foreground application directly affects the user's UX. Furthermore, as described above, there may be a plurality of foreground applications in the latest devices, but the current page cache management technique does not reflect these characteristics. Therefore, data of the foreground application is demoted by data used by the background application, which causes performance degradation of the foreground application by the background application.

In order to solve this problem, an embodiment of the present disclosure provides a method and apparatus for managing a page cache for multiple foreground applications. As illustrated in FIG. 2, in order to increase a performance of the corresponding applications in a system in which multiple foreground applications exist, the page cache management apparatus 100 delays demoting of pages for data used by the foreground application during a memory demoting process. Thereby, the page cache management apparatus 100 makes it possible to store data used by the foreground application in the page cache for a long time.

For example, the page cache management apparatus 100 distinguishes a foreground application by using a method of distinguishing a foreground application such as an Android activity stack. When the corresponding application stores data in the page cache, the page cache management apparatus 100 sets an indication that the corresponding page is being used by the foreground application. The page cache management apparatus 100 according to an embodiment of the present disclosure adds and displays a foreground use variable 'usedbyfg' to a page structure. Further, the page cache management apparatus 100 adds an opportunity variable 'opportunity' and describes how many opportunities exist in a demoting process of the page. Later, when an idle memory is insufficient, the page cache management apparatus 100 demotes pages of the page cache. In this case, when it is necessary to demote a page in which a foreground use variable 'usedbyfg' is set, the page cache management apparatus 100 checks an opportunity variable 'opportunity', and if the opportunity variable 'opportunity' is 1 or more, decreases the variable by 1 and moves the page to the head of the active list so as to give another chance. When the page to be demoted is a page by a background application, the page cache management apparatus 100 immediately demotes the page. Through such a process, pages used by the foreground application remain longer in the page cache. Consequently, the page cache management apparatus 100 can improve a performance of the foreground application and improve a user's UX.

As illustrated in FIG. 2, the page cache management apparatus 100 adds a foreground use variable 'usedbyfg' and an opportunity variable 'opportunity' to the page structure. The foreground use variable 'usedbyfg' indicates whether the page is used in the foreground application. The opportunity variable 'opportunity' represents the number of delays in page demoting.

First, when an application issues I/O and a kernel allocates a new page for I/O in the page cache, the page cache management apparatus 100 determines whether the application is a foreground application.

In step S101, if the application is a foreground application, the page cache management apparatus 100 sets a foreground use variable 'usedbyfg' of a new page to true, and sets an initial value (e.g., 10) to an opportunity variable 'opportunity' of the new page. Here, the initial value of the opportunity variable 'opportunity' may be compared with the foreground application to vary according to the importance of the foreground application.

In step S102, if the application is a background application, the page cache management apparatus 100 sets the foreground use variable 'usedbyfg' of the new page to false, and sets the minimum value (e.g., 0) to the opportunity variable 'opportunity' of the new page.

Thereafter, in order to balance a size of each list, when a page needs to be demoted from an active list to an inactive list, the page cache management apparatus 100 checks an opportunity variable 'opportunity' of the page in the tail of the active list and determines whether a value of the opportunity variable 'opportunity' is greater than 0.

In step S103, if a value of the opportunity variable 'opportunity' is greater than 0, in order to provide more opportunities in the active list while decreasing the opportunity variable value 'opportunity' of the page, the page cache management apparatus 100 moves the page to the head of the active list.

In step S104, if a value of the opportunity variable 'opportunity' is 0, the page cache management apparatus 100 demotes the page from the active list to the inactive list. Through steps S103 and S104, the page cache management apparatus 100 may maintain a page used by the foreground application in the page cache for a longer time. As a result, the page cache management apparatus 100 may operate the foreground application of each user with a priority over the background application.

In step S105, although a value of the opportunity variable 'opportunity' exceeds 0 in the inactive list, the page cache management apparatus 100 deallocates a page to be demoted in the tail of the inactive list to the storage 110. That is, even if there are remaining opportunities for pages in the inactive list, the page cache management apparatus 100 does not provide any more opportunities. This is because the latency of page allocation may be increased and a memory shortage problem may be caused by delaying deallocation of pages in the inactive list.

As a modified example, whenever the page is accessed by the foreground application, the page cache management apparatus 100 may redesignate a value of the opportunity variable 'opportunity' of the page to an initial value (e.g., 10).

Figure 3:
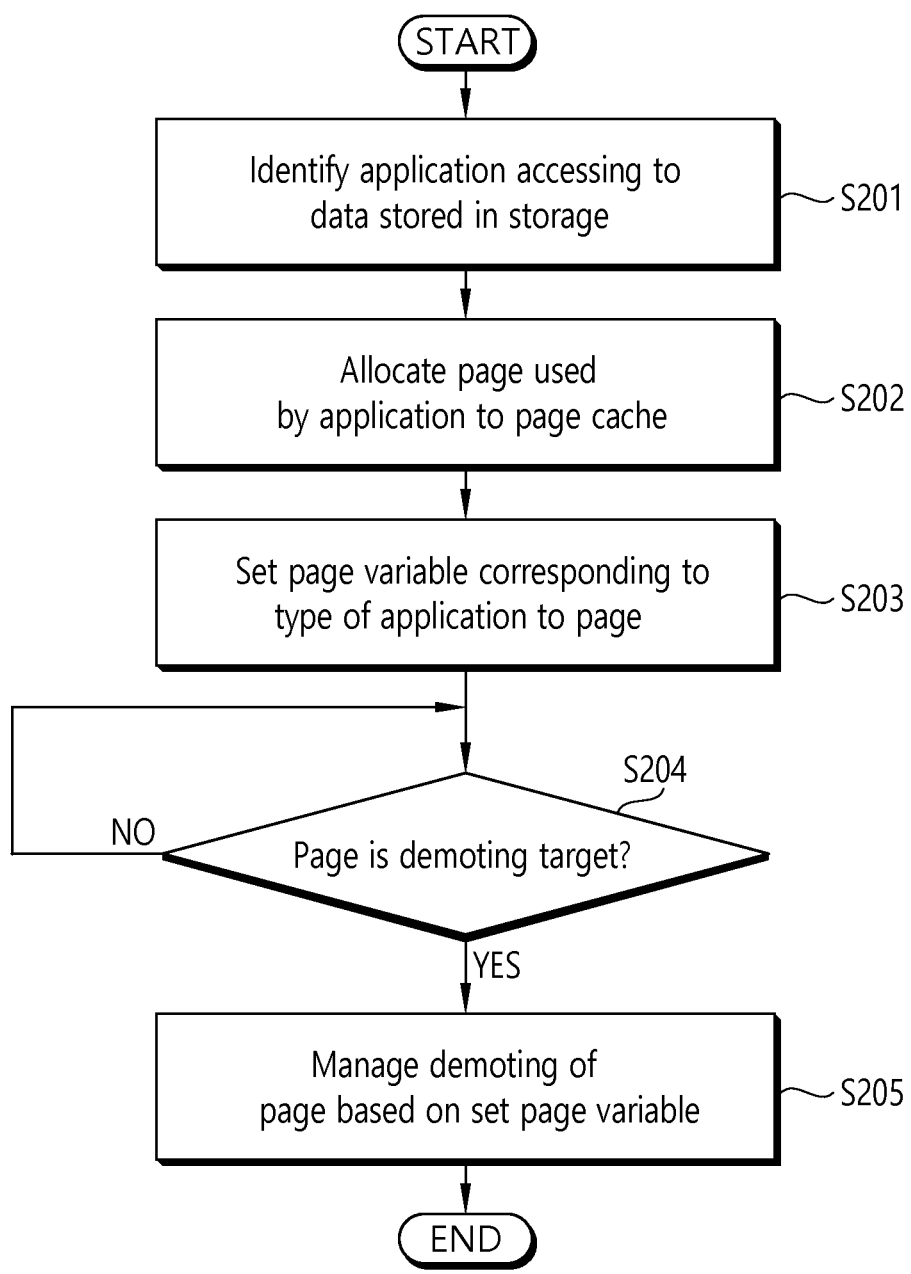
FIG. 3 is a flowchart illustrating a method and apparatus for managing a page cache for multiple foreground applications according to an embodiment of the present disclosure.

FIG. 3 is a flowchart illustrating a method and apparatus for managing a page cache for multiple foreground applications according to an embodiment of the present disclosure.

In step S201, the page cache management apparatus 100 identifies an application accessing to data stored in the storage 110.

In step S202, the page cache management apparatus 100 allocates a page used by an application for the accessed data to the page cache.

In step S203, the page cache management apparatus 100 sets a page variable corresponding to a type of the identified application to the allocated page. Here, the page variable corresponding to the type of the identified application may include a foreground use variable indicating whether the foreground application is used, and an opportunity variable indicating remaining opportunities in a page demoting process. The opportunity variable may be set to a predetermined initial value when a page is allocated to the page cache. When the application satisfies a specific condition using the allocated page, the opportunity variable may be set to a predetermined initial value. In order to delay demoting of the allocated page, the opportunity variable may be reduced by a predetermined reduction value when moving from a tail of an active list of the page cache to a head of the active list. When the identified application is multiple foreground applications, the opportunity variable may be set differently according to a priority of the foreground application.

In step S204, the page cache management apparatus 100 determines whether the allocated page is a demoting target.

In step S205, if the allocated page is a demoting target, the page cache management apparatus 100 manages demoting of the allocated page based on a set page variable. The page cache management apparatus 100 may identify a page demoting target until the allocated page is a demoting target. Here, if the identified application is a foreground application, the page cache management apparatus 100 may delay demoting of the allocated page. The page cache management apparatus 100 may delay the demoted page from the active list of the page cache to the inactive list of the page cache. When the allocated page is a demoting target in an inactive list of the page cache, the page cache management apparatus 100 may demote the allocated page. However, if the identified application is a background application, the page cache management apparatus 100 may demote the allocated page.

Figure 4:
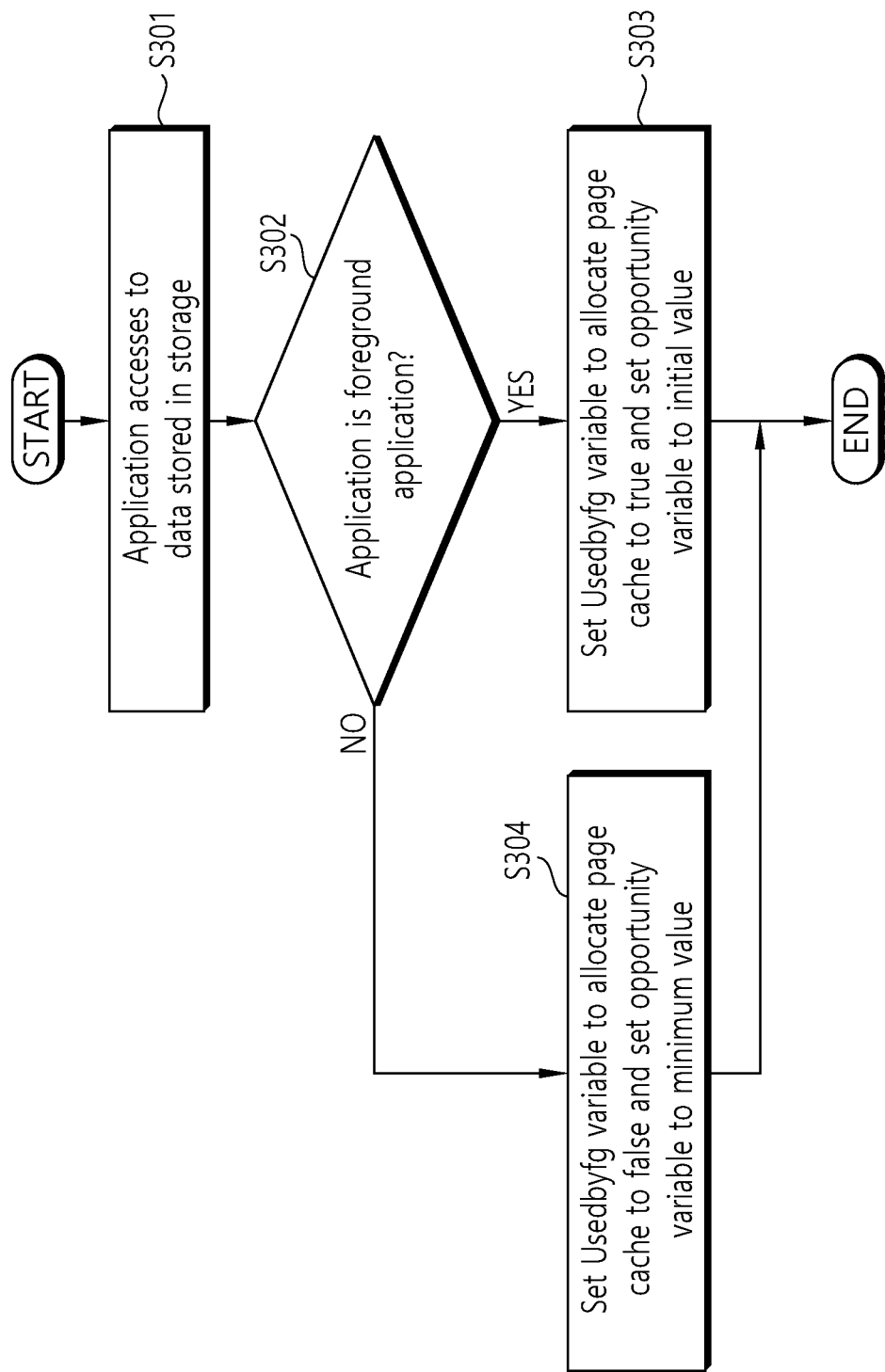
FIG. 4 is a flowchart illustrating a page allocation operation in a method and apparatus for managing a page cache for multiple foreground applications according to an embodiment of the present disclosure.

FIG. 4 is a flowchart illustrating a page allocation operation in a method and apparatus for managing a page cache for multiple foreground applications according to an embodiment of the present disclosure.

In step S301, the page cache management apparatus 100 determines whether the application accesses to data stored in the storage 110.

In step S302, the page cache management apparatus 100 determines whether the application accessing to the data stored in the storage 110 is a foreground application.

In step S303, if the application accessing to the data stored in the storage 110 is a foreground application, the page cache management apparatus 100 allocates a page cache, but sets a foreground use variable 'usedbyfg' to true and sets an opportunity variable to an initial value.

In step S304, if the application accessing to the data stored in the storage 110 is not a foreground application but a background application, the page cache management apparatus 100 allocates a page cache, but sets a foreground use variable 'usedbyfg' to false and sets the opportunity variable to a minimum value (e.g., 0).

In this way, FIG. 4 illustrates a page cache allocation operation according to an embodiment of the present disclosure. When the application is a foreground application, in the corresponding page, a foreground use variable 'usedbyfg' may be set to true, and an opportunity variable 'opportunity' may be set to a value greater than 0. When the application is a background application, a foreground use variable 'usedbyfg' may be set to false, and an opportunity variable 'opportunity' may be set to 0.

Figure 5:
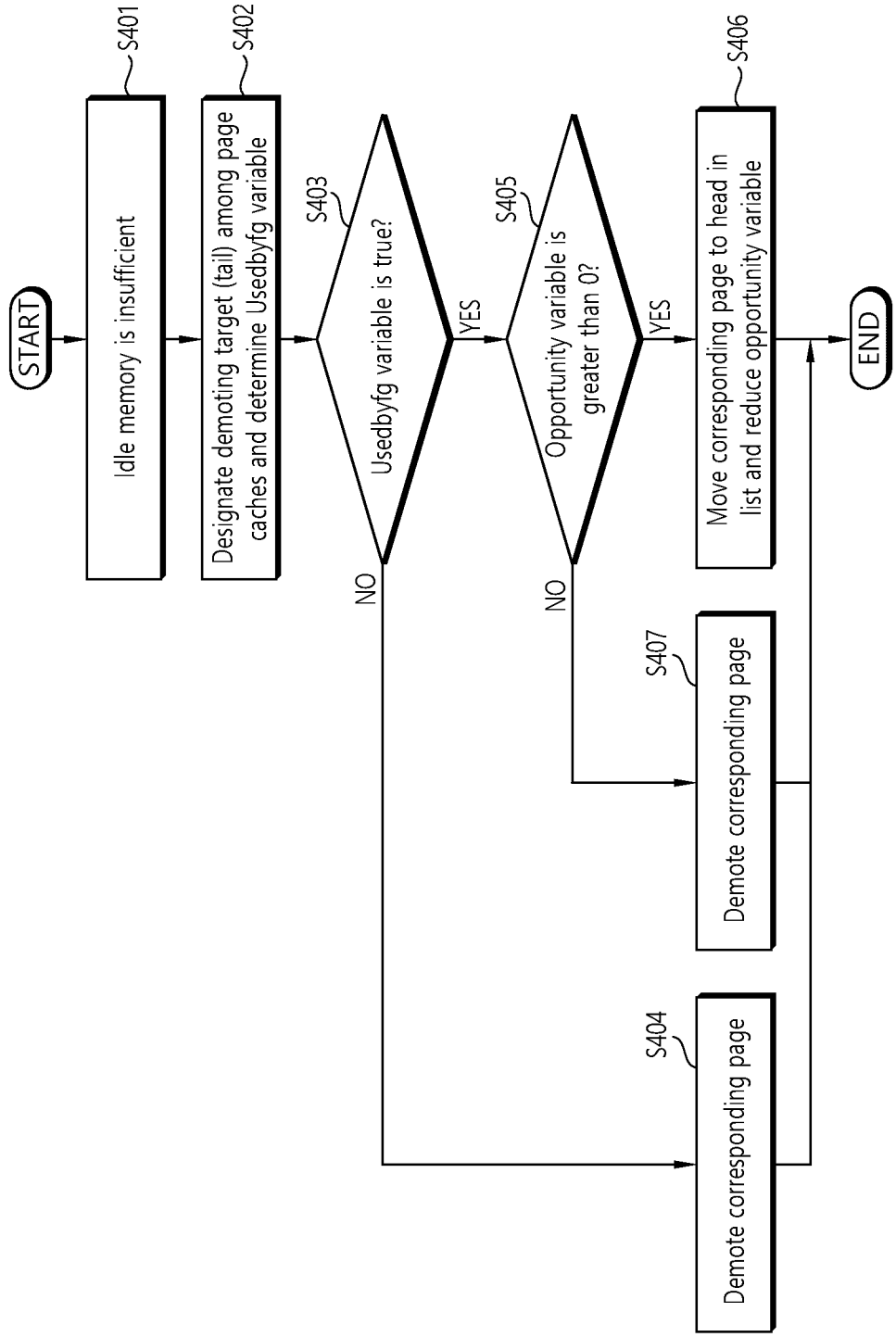
FIG. 5 is a flowchart illustrating a page demoting operation in a method and apparatus for managing a page cache for multiple foreground applications according to an embodiment of the present disclosure.

FIG. 5 is a flowchart illustrating a page demoting operation in a method and apparatus for managing a page cache for multiple foreground applications according to an embodiment of the present disclosure.

In step S401, the page cache management apparatus 100 determines whether an idle memory is insufficient.

In step S402, if the idle memory is insufficient, the page cache management apparatus 100 designates a demoting target (tail) among page caches, and determines a foreground use variable 'usedbyfg'.

In step S403, the page cache management apparatus 100 determines whether the foreground use variable 'usedbyfg' is true.

In step S404, if the foreground use variable 'usedbyfg' is false, the page cache management apparatus 100 demotes a corresponding page designated as a demoting target.

In step S405, if the foreground use variable 'usedbyfg' is true, the page cache management apparatus 100 determines whether the opportunity variable exceeds a minimum value (e.g., 0).

In step S406, if the opportunity variable exceeds a minimum value (e.g., 0), the page cache management apparatus 100 moves the page to a head in an active list of the page cache, and reduces the opportunity variable by a predetermined reduction value (e.g., 1).

In step S407, if the opportunity variable does not exceed a minimum value (e.g., 0), i.e., if the opportunity variable is a minimum value, the page cache management apparatus 100 demotes the corresponding page designated as a demoting target.

In this way, FIG. 5 illustrates a page cache demoting operation according to an embodiment of the present disclosure. First, the page cache management apparatus 100 designates a demoting target among page caches and determines a foreground use variable 'usedbyfg' of the page. If the foreground use variable 'usedbyfg' is false, the page is used by a background application. The page cache management apparatus 100 demotes the page immediately. However, if the foreground use variable 'usedbyfg' is true, the page is used by the foreground application. When the opportunity variable 'opportunity' is 1 or more, the page cache management apparatus 100 moves the page to a head of the active list and reduces the variable by 1. If the opportunity variable 'opportunity' is 0, the page cache management apparatus 100 demotes the page.

Figure 6:
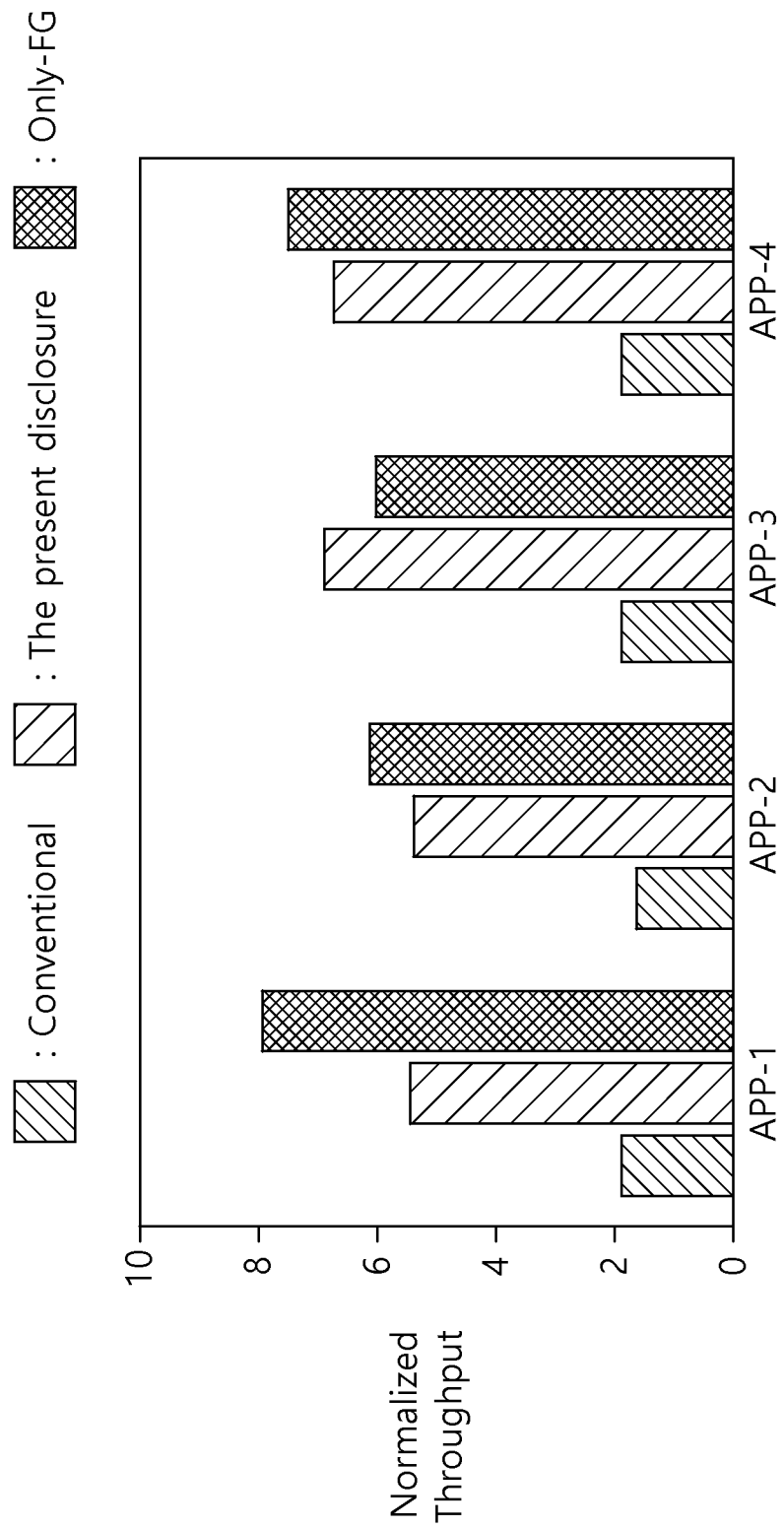
FIG. 6 is a graph illustrating performance evaluation between an embodiment of the present disclosure and the conventional art.

FIG. 6 is a graph illustrating performance evaluation between an embodiment of the present disclosure and the conventional art.

FIG. 6 is a graph illustrating performance evaluation between an embodiment of the present disclosure and the conventional art through a flexible I/O (FIO) read benchmark. In order to verify the effectiveness of an embodiment of the present disclosure, the following experiment was performed. It is assumed that there are four foreground applications and four background applications, and when they are simultaneously driven, the conventional method, an embodiment of the present disclosure, and when only the foreground applications are driven, performances are illustrated. All applications used in this experiment are the same by reading FIO 1 GB files, and this is the result when the benchmark is repeatedly executed.

An embodiment of the present disclosure showed an average total throughput about 3.43 times higher than that of the conventional art, and showed an average total throughput only 11% lower than when only the foreground application was run without a background application. This is because the data used by the foreground application is stored in the page cache for a long time through an embodiment of the present disclosure, and when the corresponding data is requested later, the data is processed in the page cache layer without occurring direct I/O to the storage 110 due to an improved performance.

In recent years, as a display size of mobile phones increases, a dual mode is used in which one display is divided into two by software. Because two foreground applications are driven in such a dual mode, it is desperate to improve a performance of such multiple foreground applications. Further, as devices capable of driving three or more simultaneous multiple foreground applications, such as a flexible display mobile phone or a dual screen mobile phone, are developed, the utility of an embodiment of the present disclosure will further increase. Finally, an embodiment of the present disclosure can be effectively utilized in a multi-user environment where multiple users simultaneously utilize a single device, such as a display wall and a table top.

The page cache management method for multiple foreground applications according to the embodiments of the present disclosure may be implemented as computer readable codes on a computer readable recording medium. The page cache management method for multiple foreground applications according to the embodiments of the present disclosure may be implemented in the form of program commands that can be executed through various computer means and recorded in a computer readable recording medium.

As a non-transitory computer readable storage medium including at least one program executable by a processor, when the at least one program is executed by the processor, the at least one program may enable the processor to provide a non-transitory computer readable storage medium including instructions that enable to identify an application accessing to data stored in the storage 110, to allocate a page used by the application for the accessed data to a page cache, to set a page variable corresponding to a type of the identified application to the allocated page, and to manage demoting of the allocated page based on the set page variable when the allocated page is a demoting target.

The above-described method according to the present disclosure may be implemented as a computer readable code on a computer readable recording medium. The computer readable recording medium includes all kinds of recording media in which data that can be decoded by a computer system is stored. For example, the computer readable recording medium may include a read only memory (ROM), a random access memory (RAM), a magnetic tape, a magnetic disk, a flash memory, an optical data storage device, and the like. Further, the computer readable recording medium may be distributed to a computer system connected through a computer communication network to be stored and executed as code that can be read in a distributed manner.

Although the present disclosure has been described with reference to the drawings and embodiments, it does not mean that the protection scope of the present disclosure is limited by the drawings or embodiments, and those skilled in the art will appreciate that various modifications and changes can be made to the present disclosure without departing from the spirit and scope of the present disclosure described in the following claims.

Specifically, the described features may be implemented in digital electronic circuitry, computer hardware, firmware, or combinations thereof. Features may be executed, for example, in a computer program product implemented in storage in a machine readable storage device for execution by a programmable processor. The features may be performed by a programmable processor executing a program of instructions to perform functions of the described embodiments by operating on input data and generating an output. The described features may be executed within one or more computer programs that can be executed on a programmable system including at least one programmable processor, at least one input device, and at least one output device coupled to receive data and instructions from a data storage system and to transmit data and instructions to a data storage system. A computer program includes a set of instructions that can be used directly or indirectly within a computer so as to perform a specific operation on a given result. The computer program is written in any form of a programming language, including compiled or interpreted languages, and may be used in any form included as a module, element, subroutine, or other unit appropriate for use in another computer environment, or as an independently operable program.

Processors appropriate for execution of a program of instructions include, for example, both general and special purpose microprocessors, and either a single processor or multiple processors of a different type computer. Further, storage devices appropriate for implementing computer program instructions and data implementing the described features include, for example, semiconductor memory devices such as EPROM, EEPROM, and flash memory devices, magnetic devices such as internal hard disks and removable disks, magneto-optical disks, and all types of non-volatile memories including CD-ROM and DVD-ROM disks. The processor and memory may be integrated within application-specific integrated circuits (ASICs) or added by ASICs.

The present disclosure described above is described based on a series of functional blocks, but is not limited by the above-described embodiments and the accompanying drawings, and it will be apparent to those of ordinary skill in the art to which the present disclosure pertains that various substitutions, modifications, and changes are possible within the scope not departing from the technical spirit of the present disclosure.

Combinations of the above-described embodiments are not limited to the above-described embodiments, and various types of combinations as well as the above-described embodiments may be provided according to implementation and/or need.

In the above-described embodiments, the methods are described based on a flowchart as a series of steps or blocks, but the present disclosure is not limited to the order of steps, and certain steps may occur in different order or concurrently with other steps as described above. Further, those of ordinary skill in the art will understand that the steps illustrated in the flowchart are not exclusive, other steps are included, or one or more steps in the flowchart may be deleted without affecting the scope of the present disclosure.

The above-described embodiments include examples of various aspects. Although all possible combinations for representing the various aspects cannot be described, those of ordinary skill in the art will recognize that other combinations are possible. Accordingly, it will be said that the present disclosure includes all other replacements, modifications, and changes falling within the scope of the following claims.

The disclosed description can have the following effects. However, because it does not mean that a specific embodiment should include all of the following effects or only the following effects, the scope of the rights of the disclosed description should not be understood as being limited thereby.

Embodiments of the present disclosure can improve performance of a foreground application by delaying demoting of pages in a page cache used by a foreground application in at least one foreground application environment.

Embodiments of the present disclosure distinguish data used by a foreground application from data used by a background application in an environment in which at least one foreground application runs, and store data of the foreground application for a long time in the page cache layer, thereby improving a performance of the foreground application.

Embodiments of the present disclosure can finally improve user experience (UX) through this result in an environment in which at least one foreground application runs.

What is claimed is:

1. A method of managing a page cache by a page cache management apparatus, the method comprising:
   identifying an application accessing to data stored in storage;
   allocating a page used by the application for the accessed data to a page cache;
   setting a page variable corresponding to a type of the identified application to the allocated page; and
   managing demoting of the allocated page based on the set page variable when the allocated page is a demoting target,
   wherein the page variable corresponding to the identified application type comprises a foreground use variable indicating whether a foreground application is used, and an opportunity variable indicating remaining opportunities in a page demoting process.

2. The method of claim 1, wherein the managing of demoting comprises delaying demoting of the allocated page in response to the identified application being the foreground application.

3. The method of claim 2, wherein the managing of demoting comprises delaying the demoted page from an active list of the page cache to an inactive list of the page cache.

4. The method of claim 1, wherein the managing of demoting comprises demoting the allocated page, in response to the allocated page being a demoting target in an inactive list of the page cache.

5. The method of claim 1, wherein the managing of demoting comprises demoting the allocated page in response to the identified application being a background application.

6. The method of claim 1, wherein the opportunity variable is set to a predetermined initial value when allocating the page to the page cache.

7. The method of claim 1, wherein the opportunity variable is set to a predetermined initial value when the application satisfies a specific condition using the allocated page.

8. The method of claim 1, wherein the opportunity variable is reduced by a predetermined reduction value when moving from a tail of an active list of the page cache to a head of the active list in order to delay demoting of the allocated page.

9. The method of claim 1, wherein, when the identified application is multiple foreground applications, the opportunity variable is differently set according to a priority of each of the multiple foreground applications.

10. A page cache management apparatus, comprising:
a storage for storing data;
a memory comprising a page cache for storing pages of data used by applications, and for storing at least one program; and
a processor connected to the storage and the memory,
wherein the processor, by executing the at least one program, is configured to:
identify an application accessing to data stored in the storage,
allocate a page used by the application for the accessed data to the page cache,
set a page variable corresponding to a type of the identified application to the allocated page, and
manage demoting of the allocated page based on the set page variable, when the allocated page is a demoting target, and
wherein the page variable corresponding to the identified application type comprises a foreground use variable indicating whether a foreground application is used, and an opportunity variable indicating remaining opportunities in a page demoting process.

11. The page cache management apparatus of claim 10, wherein, when the identified application is the foreground application, the processor delays demoting of the allocated page.

12. The page cache management apparatus of claim 11, wherein the processor delays the demoted page from an active list of the page cache to an inactive list of the page cache.

13. The page cache management apparatus of claim 10, wherein the processor demotes the allocated page when the allocated page is a demoting target in an inactive list of the page cache.

14. The page cache management apparatus of claim 10, wherein, when the identified application is a background application, the processor demotes the allocated page.

15. The page cache management apparatus of claim 10, wherein the opportunity variable is set to a predetermined initial value when allocating the page to the page cache.

16. The page cache management apparatus of claim 10, wherein the opportunity variable is set to a predetermined initial value when the application satisfies a specific condition using the allocated page.

17. The page cache management apparatus of claim 10, wherein the opportunity variable is reduced by a predetermined reduction value when moving from a tail of an active list of the page cache to a head of the active list in order to delay demoting of the allocated page.

18. The page cache management apparatus of claim 10, wherein, when the identified application is multiple foreground applications, the opportunity variable is set differently according to a priority of each of the multiple foreground applications.

* * * * *